(12) United States Patent
Yamada et al.

(10) Patent No.: US 8,914,532 B2
(45) Date of Patent: Dec. 16, 2014

(54) ADAPTIVE CONTROL OF LAYER COUNT OF LAYERED MEDIA STREAM

(75) Inventors: Hideaki Yamada, Saitama (JP); Hajime Nakamura, Saitama (JP)

(73) Assignee: KDDI Corporation, Tokyo (JP)

( * ) Notice: Subject to any disclaimer, the term of this patent is extended or adjusted under 35 U.S.C. 154(b) by 1223 days.

(21) Appl. No.: 12/496,877

(22) Filed: Jul. 2, 2009

(65) Prior Publication Data

US 2010/0005186 A1 Jan. 7, 2010

(30) Foreign Application Priority Data

Jul. 4, 2008 (JP) ................................. 2008-175195

(51) Int. Cl.
| | |
|---|---|
| *G06F 15/16* | (2006.01) |
| *H04N 21/2343* | (2011.01) |
| *G10L 25/69* | (2013.01) |
| *H04L 12/24* | (2006.01) |
| *H04N 21/2662* | (2011.01) |
| *H04N 21/439* | (2011.01) |
| *H04N 21/442* | (2011.01) |
| *H04N 21/462* | (2011.01) |
| *H04N 21/6373* | (2011.01) |
| *H04N 21/6377* | (2011.01) |
| *H04N 21/6379* | (2011.01) |
| *H04N 21/6405* | (2011.01) |
| *H04N 21/6437* | (2011.01) |
| *H04N 21/658* | (2011.01) |
| *H04N 21/81* | (2011.01) |
| *H04L 12/26* | (2006.01) |

(52) U.S. Cl.
CPC ........ *H04N 21/234327* (2013.01); *G10L 25/69* (2013.01); *H04L 41/5009* (2013.01); *H04N 21/2662* (2013.01); *H04N 21/4394* (2013.01);

(Continued)

(58) Field of Classification Search
USPC .................................................. 709/231, 250
See application file for complete search history.

(56) References Cited

U.S. PATENT DOCUMENTS

| 6,373,855 B1 | 4/2002 | Downing et al. |
|---|---|---|
| 2003/0236904 A1* | 12/2003 | Walpole et al. ................ 709/231 |

(Continued)

FOREIGN PATENT DOCUMENTS

| JP | 2000-295276 A | 10/2000 |
|---|---|---|
| JP | 2003-298677 A | 10/2003 |

(Continued)

OTHER PUBLICATIONS

UK Search Report date Oct. 29, 2009, issued in UK Patent Application No. GB0911356.

(Continued)

*Primary Examiner* — Minh-Chau Nguyen
(74) *Attorney, Agent, or Firm* — Westerman, Hattori, Daniels & Adrian, LLP (57) ABSTRACT

A technique is disclosed of controlling a layer count of actual layers within a layered media stream having a maximum number "M" of layers that include "m(0≤m≤M)" video layers and an audio layer. The technique includes: receiving from at least one destination a quality event indicative of audio quality of the audio layer; calculating an estimated value of subjective quality of the received audio layer, based on the received quality event; calculating a quality value indicative of transmission quality of the media stream, based on the calculated subjective quality, and a ratio of a layer count "m" of at least one of the video layers, to the maximum number "M;" and, based on the calculated quality value, controlling a layer count of actual layers within the media stream.

8 Claims, 8 Drawing Sheets

(52) U.S. Cl.
  CPC ..... *H04N 21/44209* (2013.01); *H04N 21/4621* (2013.01); *H04N 21/6373* (2013.01); *H04N 21/6377* (2013.01); *H04N 21/6379* (2013.01); *H04N 21/6405* (2013.01); *H04N 21/6437* (2013.01); *H04N 21/658* (2013.01); *H04N 21/8106* (2013.01); *H04L 41/5087* (2013.01); *H04L 41/509* (2013.01); *H04L 43/045* (2013.01); *H04L 43/0835* (2013.01); *H04L 43/0858* (2013.01); *H04L 43/087* (2013.01)
  USPC .......................................... 709/231; 709/232

(56) References Cited

U.S. PATENT DOCUMENTS

| | | | |
|---|---|---|---|
| 2005/0223106 A1* | 10/2005 | Ross et al. | 709/231 |
| 2006/0156363 A1* | 7/2006 | Wu et al. | 725/113 |
| 2007/0074266 A1* | 3/2007 | Raveendran et al. | 725/135 |
| 2007/0081588 A1* | 4/2007 | Raveendran et al. | 375/240.1 |
| 2007/0268836 A1 | 11/2007 | Byun et al. | |
| 2008/0117820 A1 | 5/2008 | Miyazaki et al. | |
| 2008/0306744 A1* | 12/2008 | Wang et al. | 704/500 |
| 2009/0182563 A1* | 7/2009 | Schobben et al. | 704/500 |

FOREIGN PATENT DOCUMENTS

| | | |
|---|---|---|
| JP | 2004-135017 A | 4/2004 |
| WO | 2004/084520 A1 | 9/2004 |
| WO | 2008/048155 A1 | 4/2008 |

OTHER PUBLICATIONS

United Kingdom Office Action dated Sep. 9, 2010, issued in United Kingdom Patent Application No. GB0911356.4.

* cited by examiner

| ESTIMATED QUALITY-VALUE | 0 – 1.0 | 1.0 – 2.0 | 2.0 – 3.0 | 3.0 – 4.0 | 4.0 – |
|---|---|---|---|---|---|
| DETERMINATION FLAG | DETERIORATION IN QUALITY | DETERIORATION IN QUALITY | NO CHANGE IN QUALITY | IMPROVEMENT IN QUALITY | IMPROVEMENT IN QUALITY |
| | W | W | N | B | B |

FIG. 8

| T-k | T-(k-1) | ... | T-1 | T (CURRENT) | DETERMINATION | INCREASE/DECREASE OF LAYER COUNT |
|---|---|---|---|---|---|---|
| B | B | ... | B | B | UP | INCREASE |
| W | W | ... | B | B | HOLD | HOLD |
| N | B | ... | B | B | UP | INCREASE |
| B | W | ... | W | W | DOWN | DECREASE |
| W | W | ... | W | W | DOWN | DECREASE |
| N | W | ... | W | W | DOWN | DECREASE |
| W | W | ... | B | B | HOLD | HOLD |
| B | B | ... | W | W | HOLD | HOLD |
| N | N | ... | N | N | HOLD | HOLD |
| N | N | ... | N | B | HOLD | HOLD |
| N | B | ... | B | B | HOLD | HOLD |

…

ADAPTIVE CONTROL OF LAYER COUNT OF LAYERED MEDIA STREAM

CROSS-REFERENCE TO RELATED APPLICATIONS

The present application is based on and claims the benefit of priority from Japanese Patent Application No. 2008-175195 filed Jul. 4, 2008, the content of which is incorporated herein by reference in its entirety.

BACKGROUND OF THE INVENTION

1. Field of the Invention

The invention relates generally to delivery of a layered media stream, and more particularly to control of the number of layers within the media stream (i.e., a layer count of the media stream).

2. Description of the Related Art

In recent years, in access networks which allow terminals to connect to an IP (Internet Protocol) network, a data transfer rate has been increased irrespective of whether each access network is mobile or fixed.

Along with the rapidly increasing use of such access networks, realization of large-scale media delivery services has been discussed which use an NGN (New Generation Network) as a core network. Media delivery services have been expected to have high quality and high security, which can accommodate various types of media and media delivery fashions (e.g., business models) owing to the employment of the NGN.

For definitions, the "media delivery service" means a service which allows a user's terminal to receive a media stream from a media delivery server and simultaneously reconstruct or playback the media stream. The "media stream" means audio or video content data which is to be delivered continuously in real time.

Conventionally, for a terminal to receive a media stream and simultaneously reconstruct it, the terminal requires a high performance processor and a large capacity memory to be incorporated.

In contrast, there is a technique which allows a media delivery server to transmit a layered media stream (i.e., a media stream to which a layered coding scheme has been applied), so that a terminal can reconstruct the received media stream in a manner that accommodates the throughput or the processing speed and the memory capacity of the terminal.

For definitions, the "layered coding scheme" means a scheme of coding a media stream by dividing the media stream into a plurality of layers with different levels, to thereby generate separate sets of encoded data in a hierarchical structure.

In the first or bottom layer, a set of media data with a minimum or primitive level of resolution is coded, and, in the next layer, a separate set of media data with a resolution higher than that of the first layer, to thereby allow multi-layer coding (e.g., coding based on the profile and the level in an MPEG2). The layered coding is performed depending on types of media or various quality scales, such as audio/video, perceivable frequency ranges, resolutions, or color tones.

The total number (i.e., a maximum number) "N" of layers within a media stream is equal to one of an audio layer plus "M" of video layers. In an example in which the total number "N" is equal to 21 (twenty one), the total number "N" is equal to one of an audio layer plus 20 (twenty) of video layers, that is, $N = 1 + M$, or $(21) = 1 + (20)$.

When the NGN is used for a media delivery service, the status of IP packet transmission (i.e., how good IP packet transmission is performed) is always measured in a network located between a transmitter and a receiver. When a media stream is received, if the degradation in quality (e.g., disruption or deterioration of sound or image) is caused, then a transfer resource or a transfer rate of the media stream in the IP network is controlled. This prevents degradation in quality of the IP packets.

There is a first conventional technique, as disclosed in, for example, Japanese Patent Application Publication No. 2004-135017, that allows a media delivery server to store a plurality of media streams which are to be transferred at respective different transfer rates, and that allows a terminal to select one of the different transfer rates.

There is also a second conventional technique, as disclosed in, for example, Japanese Patent Application Publication No. 2000-295276, that allows a terminal or a network system to control the transfer rate, depending on the type of a media access (i.e., the type of a MAC (Media Access Control) layer) used in an access network.

There is still also a third conventional technique, as disclosed in, for example, Japanese Patent Application Publication No. 2003-298677, that allows a terminal to transmit to a media delivery server the status of the degradation in quality of the received media data (i.e., how bad the quality is), and that allows the media delivery server to control the encoding rate or the transmission rate and transmit the media data accordingly.

This conventional technique allows a desired transfer rate of IP packets for delivery of media data to be estimated and controlled, based on the size of IP packets to be transmitted, the loss rate of the IP packets, and round trip delay measured between a terminal and a media delivery server.

There is yet also a fourth conventional technique, as disclosed in, for example, "Multi-Session Rate Control for Layered Video Multicast," coauthored by Xue Li, Sanjoy Paul, and Mostafa H. Ammar, in Proc. SPIE Multimedia Computing and Networking, vol. 3654, San Jose, Calif., January 1999, pp. 175-189, that allows a terminal by itself to control the increase/decrease of the number of layers to be layered-coded, depending on the status of degradation in quality measured by a terminal on a reception side.

This technique allows each of terminals on a reception side, by itself, to ascertain the status of degradation in quality, and allows a successively selected one of the terminals in the same order in which the terminals successively start reception of media data, to acquire the resource of the transmission frequency band.

There is still yet also a fifth conventional technique, as disclosed in, for example, "Equation-based Layered Video Multicast with Explicit Congestion Notification," coauthored by Kitae Nahm, Qing Li, and C.-C. Jay Kuo, in Proc. Global Telecommunications Conference, 2003, GLOBECOM '03, IEEE, vol. 6, pp. 3580-3584, that allows a transmission device on a transmission side to control, by its independent decision, the increase/decrease of the number of layers to be layered-coded.

When the first conventional technique is implemented, the transfer rate is selected by a terminal, according to only its independent decision, irrespective of whether the whole network is congested or not.

This results in a risk that the whole network can lose the quality of service in a large scale, with an additional risk that each terminal can increase the traffic congestion of the network for an elongated period, because of each terminal's independent selection of an I transfer rate.

When the second conventional technique is implemented for an individual terminal which uses selectively a plurality of access networks, there is a need to prepare different kinds of control schemes for respective access networks.

Additionally, this may make differences between the result of control based on layers lower than a MAC (Media Access Control) layer, and the quality of an IP application service, due to control of application layers such as packet loss compensation.

When the third conventional technique is implemented, the load of a media delivery server and the traffic congestion of the network may increase due to additional traffic for allowing a terminal to transmit to the media delivery server, information indicative of how much the quality of service has been degraded.

When the fourth conventional technique is implemented, terminals acquire the resource of the transmission frequency band in the same order in which the terminals successively start reception of media data, resulting in a failure to keep the terminals to be equal to each other with respect to the resources.

This allows each terminal to control the increase/decrease of the number of layers within a layered media stream (this control spends much time in, in particular, decreasing the number of layers), resulting in a degraded ability of the control to follow up changes in congestion level in the whole network.

When the fifth conventional technique is implemented, a transmission device requires communication with every reception device for achieving the goal.

In this technique, the transmission device principally performs rate control. For this reason, if a link between a multicast router and a transmission node acts as a bottleneck link among subnets that the transmission device belongs to, then the status of traffic congestion will become worse.

In addition, even if the fifth conventional technique is implemented in combination with the fourth conventional technique, there is a need to monitor and control the quality of individual streams. This also makes it more difficult for a communication node which concurrently executes a plurality of priority-based data transfer processes to ensure scalability in a filtering process.

In view of the foregoing, it would be desirable to control the number of layers within a media stream, based on a quality perceived by a user who is a viewer or listener at a terminal on a reception side, for allowing a media stream to be received with high quality irrespective of fluctuations in transmission quality of a network.

BRIEF SUMMARY OF THE INVENTION

According to some aspects of the invention, a technique is provided of controlling a layer count of actual layers within a layered media stream. The media stream is structured to have a maximum number "M" of layers that include "m($0 \leq m \leq M$)" video layers and an audio layer.

This technique includes receiving from at least one destination a quality event indicative of audio quality of the audio layer which has been received by the at least one destination, and calculating an estimated value of subjective quality of the received audio layer, based on the received quality event.

This technique further includes calculating a quality value indicative of transmission quality of the media stream, based on the calculated subjective quality, and a ratio of a layer count "m" of at least one of the video layers, to the maximum number "M," wherein the at least one video layer is being transmitted, and, based on the calculated quality value, controlling a layer count of actual layers within the media stream, wherein the actual layers are to be transmitted to the at least one destination.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

According to a first aspect of the invention, there is provided an apparatus for transmitting to at least one destination a layered media stream which is structured to have a maximum number "M" of layers that include "m(0≤m≤M)" video layers and an audio layer, the apparatus comprising:

a quality-event receiver configured to receive from the at least one destination a quality event indicative of audio quality of the audio layer which has been received by the at least one destination;

a subjective-quality calculator configured to calculate an estimated value of subjective quality of the received audio layer, based on the received quality event;

a quality-value calculator configured to calculate a quality value indicative of transmission quality of the media stream, based on the calculated subjective quality, and a ratio of a layer count "m" of at least one of the video layers, to the maximum number "M," wherein the at least one video layer is being transmitted; and a layer-count controller configured to control, based on the calculated quality value, a layer count of actual layers within the media stream, wherein the actual layers are to be transmitted to the at least one destination.

This apparatus allows the number of layers within a media stream to be controlled based on quality perceived by a user who is a viewer or listener at a terminal on a reception side, to thereby make it easier to keep the quality high with which the user receives the media stream, irrespective of fluctuations in transmission quality of a network.

According to a second aspect of the invention, there is provided a communication node that is located between a media delivery server and a plurality of terminals, that receives a layered media stream from the media delivery server in a multicast mode, and that transmits the received media stream to the plurality of terminals in a multicast mode, wherein the layered media stream which is structured to have a maximum number "M" of layers that include "m(0≤m≤M)" video layers and an audio layer, the communication node comprising:

a quality-event receiver configured to receive from each terminal a quality event indicative of audio quality of the audio layer which has been received by each terminal;

a subjective-quality calculator configured to calculate an estimated value of subjective quality of the received audio layer, based on the received quality event;

a quality-value calculator configured to calculate a quality value indicative of transmission quality of the media stream, based on the calculated subjective quality, and a ratio of a layer count "m" of at least one of the video layers, to the maximum number "M," wherein the at least one video layer is being transmitted; and a layer-count controller configured to control, based on the calculated quality value, a layer count of selected ones of actual layers of the media stream which have been received from the media delivery server, wherein the selected ones of the actual layers are to be transmitted to the plurality of terminals.

According to a third aspect of the invention, there is provided a method of controlling a layer count of actual layers within a layered media stream which is structured to have a maximum number "M" of layers that include "m(0≤m≤M)" video layers and an audio layer, the method comprising the steps of:

receiving from at least one destination a quality event indicative of audio quality of the audio layer which has been received by the at least one destination;

calculating an estimated value of subjective quality of the received audio layer, based on the received quality event;

calculating a quality value indicative of transmission quality of the media stream, based on the calculated subjective quality, and a ratio of a layer count "m" of at least one of the video layers, to the maximum number "M," wherein the at least one video layer is being transmitted; and based on the calculated quality value, controlling a layer count of actual layers within the media stream, wherein the actual layers are to be transmitted to the at least one destination.

According to a fourth aspect of the invention, there is provided a computer-readable storage medium which has stored therein a program, when executed by a computer, to control a layer count of actual layers within a layered media stream which is structured to have a maximum number "M" of layers that include "m(0≤m≤M)" video layers and an audio layer, the program comprising:

instructions for receiving from the at least one destination a quality event indicative of audio quality of the audio layer which has been received by at least one destination;

instructions for calculating an estimated value of subjective quality of the received audio layer, based on the received quality event;

instructions for calculating a quality value indicative of transmission quality of the media stream, based on the calculated subjective quality, and a ratio of a layer count "m" of at least one of the video layers, to the maximum number "M," wherein the at least one video layer is being transmitted, and instructions for controlling, based on the calculated quality value, a layer count of actual layers within the media stream, wherein the actual layers are to be transmitted to the at least one destination.

The "computer-readable storage medium" may be realized in any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

Illustrative Embodiments

According to the invention, the following modes are provided as illustrative embodiments of the invention.

According to a first mode of the invention, there is provided the apparatus according to the first aspect of the invention, wherein the quality event is defined to include a packet loss rate and packet delay information including at least one of a packet delay and a delay jitter value in packet transmission of the audio layer, the subjective quality is defined by a MOS (Mean Opinion Score) calculated based on the packet loss rate and the packet delay information, and the quality value is defined to include a product of the ratio and the MOS.

According to a second mode of the invention, there is provided the apparatus according to the first mode, wherein the MOS is calculated by an n-th degree equation described by coefficients and variables indicative of the packet loss rate and the packet delay information, and the coefficients are predetermined, depending on a kind of a to-be-assessed coding scheme applied to the media stream, such that a difference is minimized between a reference MOS (Mean Opinion Score) of the received audio layer, and an estimated MOS (Mean Opinion Score) of the received audio layer, wherein the reference MOS is calculated based on at least one of subjective quality and objective quality of the received audio layer, and the estimated MOS is calculated using a non-linear regressive model defined by the equation.

According to a third mode of the invention, there is provided the apparatus according to any one of the first aspect and the first and second modes, wherein the quality-value calculator is configured to calculate the quality value repeatedly in time series, to thereby produce successive quality values, the apparatus further comprises a quality-value recorder configured to record a most recent predetermined number of ones of the successive quality values that were produced, wherein the layer-count controller is configured to control the layer count of the actual layers within the media stream, based on the most recent predetermined number of quality values that have been recorded by the quality-value recorder.

In an example of this third mode, the quality value may be in the form of a determination flag which indicates whether transmission quality of the media stream is good or bad.

According to a fourth mode of the invention, there is provided the apparatus according to any one of the first aspect and the first through third modes, wherein the media stream is transmitted using RTP (Real-time Transport Protocol) packets and RTCP (RTP Control Protocol) packets, and the quality event is measured based on information contained in headers of the RTP packets and information contained in the RTCP packets, and is transmitted using the RTCP packets.

It is added that each of the above-described second through fourth aspects of the invention may be practiced in arrangements in which the features employed in the above-described first through fourth modes of the invention, respectively, are employed individually or severally in combination.

Several presently preferred embodiments of the invention will be described in more detail by reference to the drawings in which like numerals are used to indicate like elements throughout.

First Exemplary Embodiment

Figure 1:
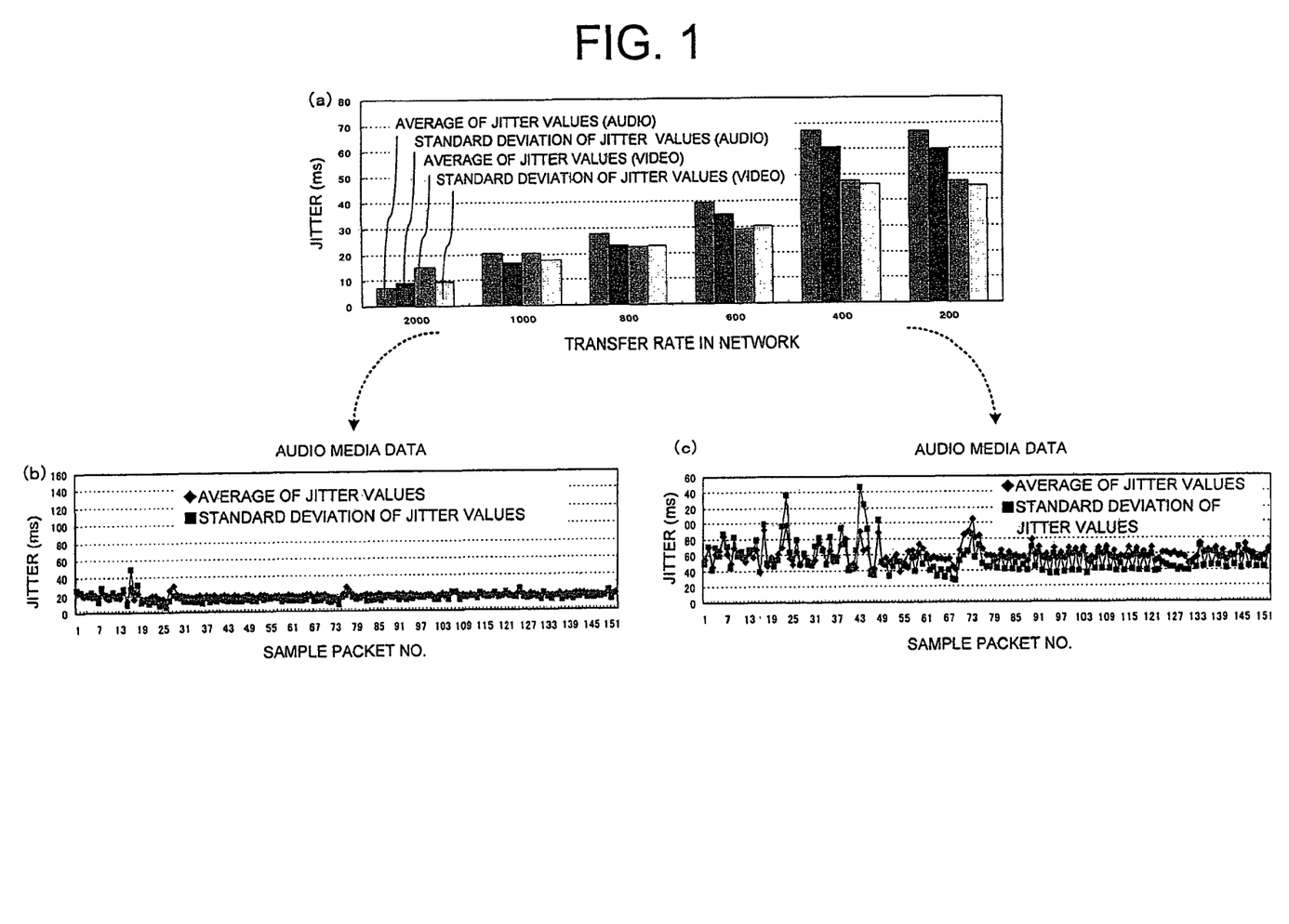
FIG. 1(a) is a graph indicating packet delay jitter values versus network transfer rates (bands), for respective sets of data including audio media data and video media data which together constitute a layered media stream.
FIG. 1(b) is a graph indicating packet delay jitter values measured for a plurality of successive packets for the audio media data, when the transfer rate is high (2,000 bps)
FIG. 1(c) is a graph indicating packet delay jitter values measured for a plurality of successive packets for the audio media data, when the transfer rate is low (200 bps)

FIGS. 1(a)-1(c) are graphs indicating packet delay jitter values versus network transfer rates (transfer bands), measured during transmission of a general layered-coded media stream (hereinafter, referred to simply as "media stream" or "media").

The media stream is structured to have "M(=m+1)" layers which is comprised of a single audio layer (i.e., a single set of audio media data) and "m" video layers (i.e., "m" sets of video media data).

FIG. 1(a) is a graph indicating packet delay jitter values (average values) versus network transfer rates (transfer bands [bps]), measured for the single set of audio media data and the "m" sets of video media data, on a media-data by media-data basis.

FIG. 1(b) is a graph indicating a temporal change in a packet delay jitter value (an average value) measured for the audio media data at a higher transfer rate (in a broader transfer band).

FIG. 1(c) is a graph indicating a temporal change in a packet delay jitter value (an average value) measured for the same audio media data at a lower transfer rate (in a narrower transfer band).

It is noted that the measurements plotted in FIGS. 1(a)-1(c) were obtained when a layer count "m" of selected ones of the whole video layers was kept constant relative to the total number (i.e., the maximum number) of layers within the media data.

Throughout the specification, the term "delay jitter" is used to mean the variation of the delays with which packets traveling on a network connection reach their destinations.

As FIGS. 1(a)-1(c) demonstrate, when a transfer rate is higher (a transfer band is broader), the delay jitter value is smaller, and, in contrast, as the transfer rate becomes lower (the transfer band becomes narrower), the delay jitter value increases. It is easily understood that the average delay jitter value of the audio media data becomes larger in fluctuation, as the transfer rate becomes lower (the transfer band becomes narrower).

An event that, for audio media data, a variation-over-time of the delay jitter value has become increasing in level, despite that the layer count "m" of the video media data is kept constant, indicates an increase in traffic congestion of the transfer route of the network. Conversely, an event that the variation-over-time of the delay jitter value has become decreasing in level, indicates a decrease in traffic congestion of the transfer route of the network.

Some illustrative embodiments of the present invention, which will be described later, allow the delay jitter values of audio media data to be monitored, to thereby change the layer count "m" of video media data, depending on the actual level of traffic congestion of the transfer route of the network. This enables the quality of media data perceived by the user to be kept the same, irrespective of fluctuations in traffic congestion of the transfer route of the network.

Figure 2:
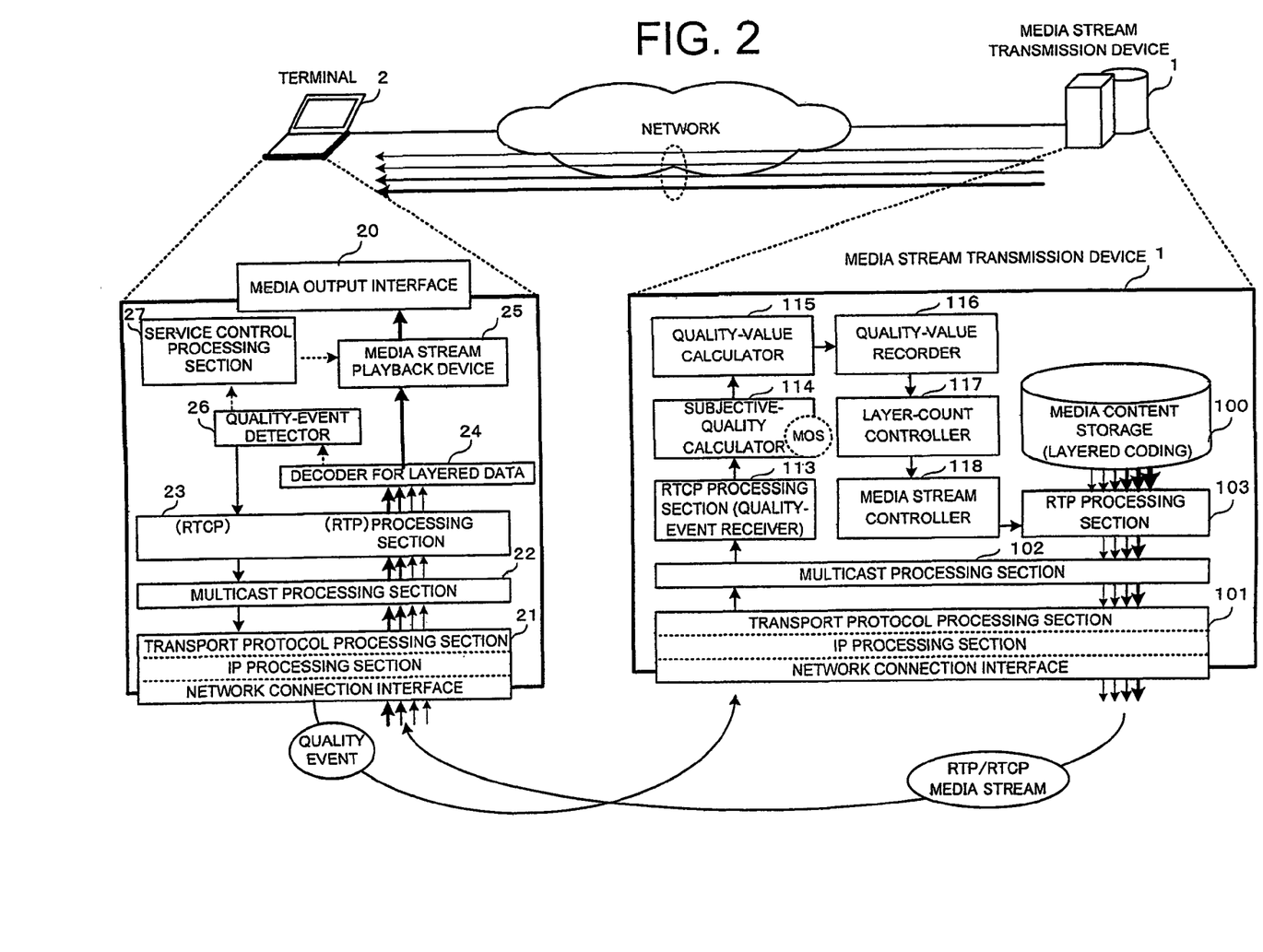
FIG. 2 is a functional block diagram illustrating a media stream transmission device constructed according to a first illustrative embodiment of the present invention, together with a representative terminal used in connection with the media stream transmission device.

FIG. 2 illustrates in a functional block diagram a media stream transmission device 1 which is constructed according to a first illustrative embodiment of the present invention and which is for transmitting a layered media stream (e.g., layered IP multicast streaming).

FIG. 2 further illustrates a representative one of a plurality of terminals (e.g., reception devices, communication devices, personal computers or mobile phones) 2 which are connected to the media stream transmission device 1 via a network. Each terminal 2 receives a user-specified media stream from the media stream transmission device 1.

The media stream transmission device 1 is according to an embodiment of the first aspect of the invention. The media stream transmission device 1 implements a method (described later) of controlling the layer count "m" of available ones of the whole video layers (i.e., a layer-count-control method), wherein the method is according to an embodiment of the third aspect of the invention.

To this end, in the media stream transmission device 1, a computer (not shown) executes a specific program (not shown) for controlling the layer count "m" of video media data, wherein the program has been stored in a computer-readable storage medium (not shown). The storage medium is according to an embodiment of the fourth aspect of the present invention.

The media stream transmission device 1 is configured to function both as a media delivery server and as a media stream control server.

To function as a media delivery server, the media stream transmission device 1 is configured to include a media content storage 100 for storing layered media contents, a packet transmitter/receiver 101, a multicast processing section 102, and an RTP (Real-time Transport Protocol) processing section 103.

The packet transmitter/receiver 101 is for processing communication protocols used for layers lower than a transport layer, and more specifically, is comprised of a transport protocol processing section (UDP (User Datagram Protocol)/TCP (Transmission Control Protocol)), an IP processing section, and a network connection interface.

The RTP processing section 103 is configured to packetize a layered media stream outputted from the media content storage 100, into RTP packets. The media stream packetized into RTP-packets is outputted into the multicast processing section 102.

The multicast processing section 102 is configured to transmit RTP packets in a multicast mode (layered IP multicast) to one or more communication nodes (not shown) and the terminal 2. The multicast transmission is performed based on a multicast group identifier. Packets not for the multicast transmission are transmitted in a unicast mode.

In the packet transmitter/receiver 101, a media stream (in RTP packets) outputted from the multicast processing section 102 is transformed into UDP packets by the transport protocol processing section.

The UDP packets are, in turn, transformed into IP packets by the IP processing section. The IP packets are transmitted from the network connection interface. The network connection interface is a physical layer connected to wired or wireless access networks (e.g., a mobile phone network, a WiMAX network, wired broadband network, etc.).

To function as a media stream control server, the media stream transmission device 1 is further configured to an RTCP (RTP Control Protocol) processing section (a quality-event receiver) 113 (which implements the step of receiving in the method according to the above-described third aspect of the invention), a subjective-quality calculator (a subjective-quality estimator) 114 (which implements the step of calculating an estimated subjective quality in the same method), a quality-value calculator (a quality-value estimator) 115 (which implements the step of calculating a quality value in the same method), a quality-value recorder 116, a layer-count controller 117 (which implements the step of controlling in the same method), and a media stream controller 118.

The RTCP processing section 113 receives RTCP packets which contain quality events (or sets of quality-related information), from the terminal 2 which is subordinate to the RTCP processing section 113. The quality event indicates transmission quality of a media stream in the terminal 2, which includes packet loss rates and delay jitter values. These packet loss rates and delay jitter values are initially contained in RTCP packets.

In this regard, the term "event" may be used to mean a "thing which happens," but is used here to solely mean "information."

In operation, the RTCP processing section 113 identifies specific information on a media stream which the media stream transmission device 1 is transmitting to the terminal 2, wherein the information includes IP addresses of a source and a destination, multicast group identifiers, and service identifiers, and then, the RTCP processing section 113 informs the subjective-quality calculator 114 of the packet loss rates and the delay jitter values.

More specifically, the RTCP processing section 113 collects quality events from all the terminals 2 which are connected and subordinate to the media stream transmission device 1, and then selects the worst one among the collected quality events. The RTCP processing section 113 uses the selected quality event (i.e., the worst quality event) as a representative quality event of a to-be-controlled network segment, for control of the layer count "m" of video media data.

The subjective-quality calculator 114 is configured to calculate an estimated value of a subjective quality (i.e., a subjective characteristic of audio quality) of audio media data, based on the received quality event. In this regard, the "subjective quality" is defined as a MOS (Mean Opinion Score) obtained based on a packet loss rate and a delay jitter value.

Originally, the MOS (cf. ITU (International Telecommunication Union)-T P.800) is for subjective assessment of a phone call quality, and represents the arithmetic mean average of all the individual quality five-point-scale assessments (or scores) given by listeners who listened to a phone call.

As well known, the MOS is expressed as a single number in the range 1 to 5, where "1" is the lowest perceived audio quality measurement (the quality is bad or worst), and "5" is the highest perceived audio quality measurement (the quality is excellent or best).

The types of the MOS include a listening MOS (MOS-LQ) obtained in a listening situation, by listeners who only listen to voices emitting from a receiver, and a conversation MOS (MOS-CQ) obtained in a conversation situation, by listeners who actually listen and talk to others. In this embodiment, the listening MOS is more preferable.

Figure 3:
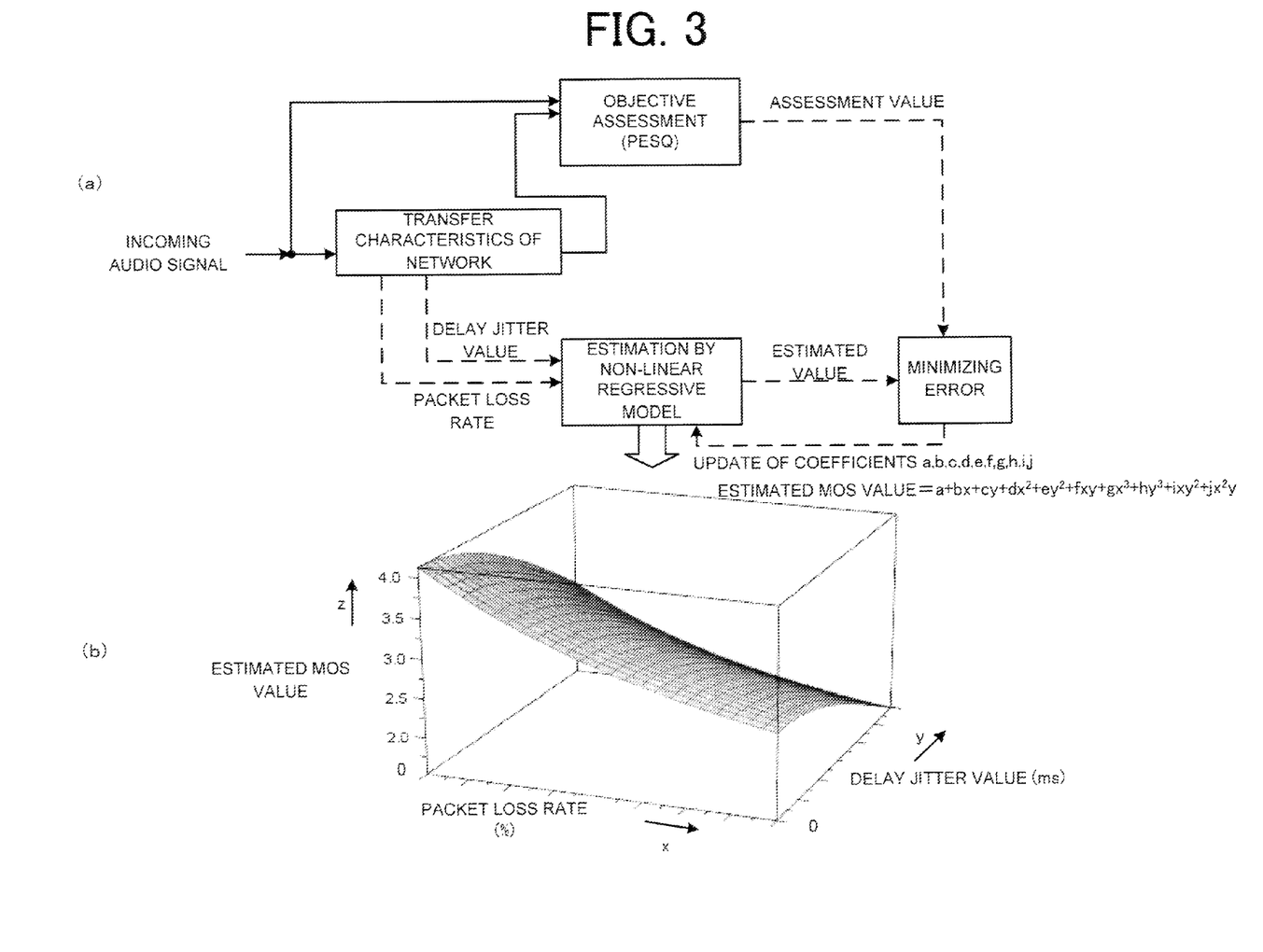
FIG. 3(a) is a schematic diagram for explanation of the theory by which an n-th degree equation for calculation of a MOS value is derived, wherein the equation is used by a subjective-quality calculator depicted in FIG. 2 to calculate the MOS value based on a packet loss rate and a delay jitter value.
FIG. 3(b) is a graph indicating the characteristic of the equation.

FIG. 3(a) is a conceptual diagram for explanation of the theory by which an n-th degree equation for calculation of a MOS value is derived, wherein the equation is used by the computer to automatically (without requiring any user intervention) calculate an estimate of a MOS value based on a packet loss rate and a delay jitter value.

An example of the n-th degree equation is the following third degree equation, the characteristic of which is represented by the graph of FIG. 3(b):

$$MOS = a + bx + cy + dx^2 + ey^2 + fxy + gx^3 + hy^3 + ixy^2 + jx^2y,$$

where, x: packet loss rate
y: delay jitter value, and
a, b, c, d, e, f, g, h, i, and j: coefficients.

For the graph of FIG. 3(b), the x-axis denotes a packet loss rate, the y-axis denotes a delay jitter value, and the z-axis denotes a MOS value. As this graph demonstrates, a MOS value can be derived by entry of the specific values of the packet loss rate "x" and the delay jitter value "y" into the n-th degree equation.

An important issue here is how to specify each of the coefficients in the third degree equation.

FIG. 3(a) is a conceptual block diagram for explanation of the theory by which the coefficients of the n-th degree equation are identified. Each coefficient of this equation is specified depending on the kind of a to-be-assessed coding scheme which is applied to a media stream (e.g., which one of an MPEG, an MPEG-2 and an MPEG-4 is employed).

Each coefficient of the equation is further specified, such that a difference is minimized between a reference MOS (Mean Opinion Score) indicative of audio quality of an incoming audio signal (i.e., an audio media layer stream, that is, audio media data), and an estimated MOS (Mean Opinion Score) of the same incoming audio signal. The reference MOS is defined as an objective assessment value of audio quality by PESQ (Perceptual Evaluation of Speech Quality), while the estimated MOS is calculated using a non-linear regressive model defined by the u-th degree equation.

As a result, all the coefficients in the n-th degree equation are identified so that the n-th degree equation can reflect a plurality of objective quality values, in a statistical manner by reference to those objective quality values.

The PESQ (cf. ITU-T P.862) is objective assessment of audio quality, is the result of integration of a PSQM (Perceptual Speech Quality Measure) which is for assessment of the quality of a coded speech, and a PAMS (Perceptual Analysis Measurement System) which allows for the effects of packet loss rates and delay jitter values, and is suitable for VoIP (Voice over Internet Protocol) quality assessment. For the PESQ, audio quality is ranked as a number in the range 0 to 4.5.

The MOS, which can assess audio quality in a manner which is closer to human sense perception than any other types of audio quality assessment, requires an assessor or listener. In contrast, the PESQ has been developed to assess audio quality without requiring any assessor. Therefore, a value of the PESQ can be automatically calculated by the computer, once audio media data to be assessed is provided.

In this embodiment, the non-linear regressive mode which is defined by the equation for calculation of the MOS has a third degree, but the model degree is not limited to a third degree. The model degree can be determined by a tradeoff between precision requirements and computational load.

Further, in this embodiment, the subjective quality is employed as the reference MOS, but, if a MOS can be obtained by an alternative manner which does not use the n-th degree equation, the MOS may be employed as the reference MOS, instead of the subjective quality.

The quality-value calculator 115 illustrated in FIG. 2 is configured to calculate an estimated quality-value indicative of the status of transmission quality of a media stream (more precisely, the audio quality of audio media data), based on the ratio ("m/M") of the number "m" of video layers that are being transmitted, to the maximum number "M" of layers, and the MOS value, instead of using solely the MOS value as the estimated quality value.

More specifically, the estimated quality value is calculated by the following equation:

$$\text{Estimated Quality Value} = m/M \times \text{MOS value}.$$

For example, even if a MOS value when the ratio "m/M" is equal to 29/30, and a MOS value when the ratio "m/M" is equal to 1/30 are coincident with each other, the corresponding estimated quality values are quite different. When the ratio "m/M"=29/30, the transmission quality of the network is better than when the ratio "m/M"=1/30, and the transfer band of the network route has a broader unoccupied range, with a smaller amount of packet loss, etc.

The ratio "m/M" is always smaller than "1," and therefore, the product of the ratio "m/M" and the MOS value makes it impossible for the estimated quality value to exceed the MOS value. In addition, as the transmission quality of the network becomes better, the ratio "Nm/M" becomes larger, and eventually, the estimated quality value becomes larger.

It is added that each terminal 2 receives from the media stream transmission device 1, information for identifying the maximum number "M" and the layer count "m" of video layers that each terminal 2 is about to receive from the media stream transmission device 1.

The quality-value recorder 116 depicted in FIG. 2 is configured to record a most recent predetermined number of successive determination flags based on successive estimated-quality-values (instead, the successive estimated-quality-values as such can be recorded).

Each determination flag is used for indicating or recording whether the transmission quality of a media stream (more precisely, the audio quality) has become worse, has become better, or has no change.

Figure 7:
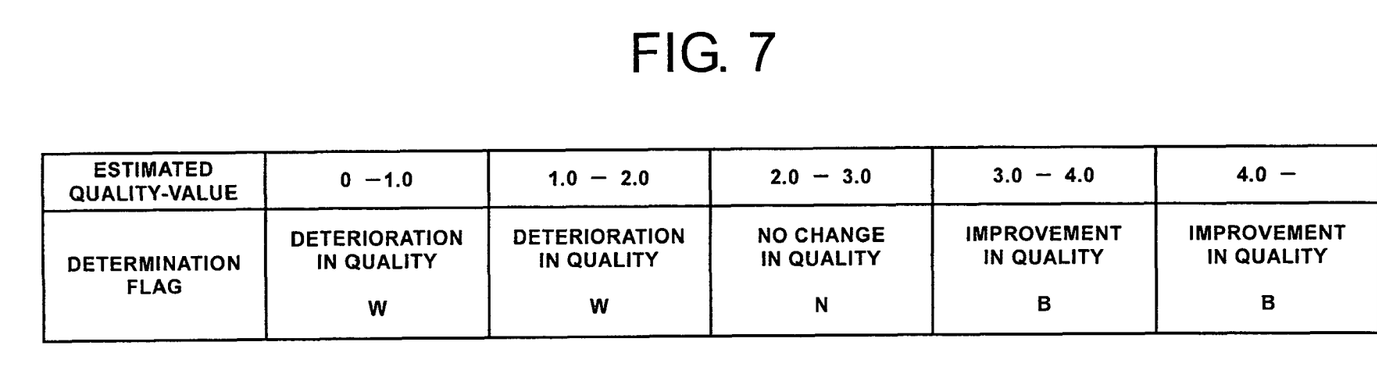
FIG. 7 is a table illustrating the characteristic of a determination flag to be recorded by a quality-value recorder depicted in FIG. 2.

As illustrated in, for example, FIG. 7 in a table representation, the status of each determination flag is determined by thresholding the corresponding estimated-quality-value.

More specifically, the quality-value recorder 116 causes the determination flag to indicate the status of "W (becoming worse)" if the estimated quality value is equal to or smaller than "2," causes the determination flag to indicate the status of "B (becoming better)" if the estimated quality value is equal to or larger than "3," and causes the determination flag to indicate the status of "N (no change)" if none of these two conditions is met.

Figure 8:
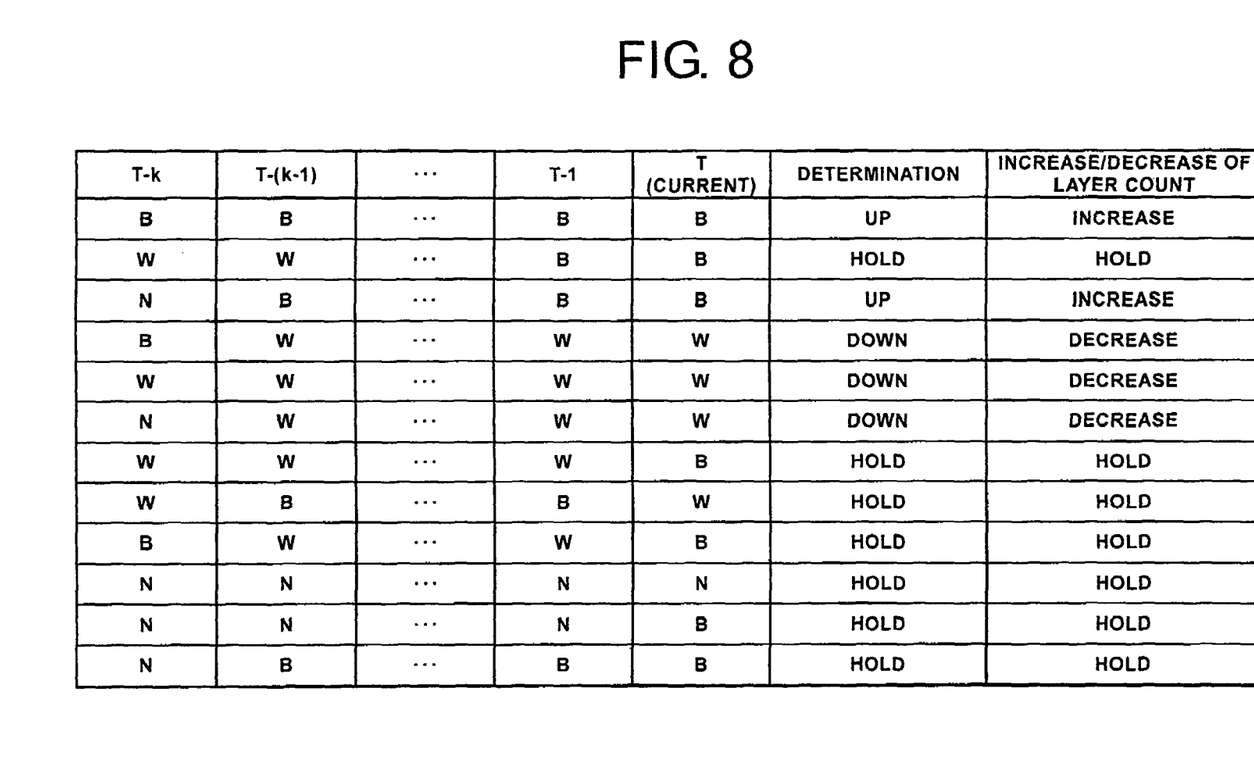
FIG. 8 is a table illustrating a time history of the status of the determination flag depicted in FIG. 7, a corresponding determination result, and a corresponding desired direction in which the number of layers is to be changed, respectively for a plurality of hypothetical example cases, wherein the determination flag, the determination result and the desired direction are recorded by the quality-value recorder depicted in FIG. 2.

FIG. 8 illustrates in a table, information stored by the quality-value recorder 116.

As the table of FIG. 8 demonstrates, the quality-value recorder 116 stores a most recent predetermined number (k+1) of determination flags which range from a T-th determination flag (i.e., the newest determination flag) to a (T-k)-th determination flag (i.e., the oldest determination flag) which is k cycles older than the newest determination flag.

The quality-value recorder 116 further stores a determination result based on the (k+1) most recent determination flags stored, and a desired direction in which the layer count "m" of the video media data (hereinafter, referred to as "video-layer-count "m"") to be changed and which is determined based on the determination result. This will be described later in more detail.

The layer-count controller 117 depicted in FIG. 2 is configured to control the video-layer-count "m," based on the estimated quality value. More specifically, the layer-count controller 117 controls the video-layer-count "m," based on the (k+1) most recent determination flags recorded by the quality-value recorder 116.

Still more specifically, the layer-count controller 117 determines whether the audio quality has been improved ("UP"), has been held ("HOLD"), or has been deteriorated ("DOWN"), from a history of the (k+1) most recent determination flags (e.g., a flag history of B, B, W, W and W, a flag history of W, W, B, W and W).

More specifically, in an example, the layer-count controller 117 determines that the audio quality has been improved if at least a predetermined number of ones of the (k+1) most recent determination flags are all "B," determines that the audio quality has been deteriorated if at least the predetermined number of determination flags are all "W," and determines that the audio quality has been held if none of these two conditions is met.

As illustrated in FIG. 8, the determination result of the layer-count controller 117 is stored by the quality-value recorder 116.

The layer-count controller 117 issues a command to increase the video-layer-count "m" if the determination result is "UP (the audio quality has been improved)," a command to hold the video-layer-count "m" if the determination result is "HOLD (the audio quality has been held)," and a command to decrease the video-layer-count "m" if the determination result is "DOWN (the audio quality has been deteriorated)."

More specifically, the layer-count controller 117 controls the video-layer-count "m," such that, if the determination result based on the (k+1) most recent determination flags is "UP," the video-layer-count "m" is incremented a predetermined number, if the determination result is "HOLD," the video-layer-count "m" is kept the same, and if the determination result is "DOWN," the video-layer-count "m" is decremented a predetermined number.

As illustrated in FIG. 8, the quality-value recorder 116 further stores the desired direction to change the video-layer-count "m." More specifically, the quality-value recorder 116 further stores "INCREASE," "HOLD," or "DECREASE," as the indication of the desired direction to change the video-layer-count "m."

The layer-count controller 117 covers control of the video-layer-count "m" for all the terminals 2 which are connected and subordinate to the layer-count controller 117.

The layer-count controller 117 sends a control event (i.e., a control command including an identifier of increase, hold or decrease of the video-layer-count "m").

It is added that the control event is generated for all the terminals 2 which are connected and subordinate to the layer-count controller 117, per each multicast group identifier and per each service identifier.

It is also added that the control event preferably includes the following sets of control information, in addition to the information required for the layer-count control:
(1) the time between RTP packets in a media stream;
(2) a packet loss compensation strength and/or a compensation algorithm in a packet loss compensator;
(3) a transfer rate in an encoder;
(4) the number of media frames contained in UDP packets or TCP packets in a transport packet transceiver/receiver; and
(5) the number of streams which are concurrently connected for the same content.

The media stream controller 118 is configured to control the video-layer-count "m" of a media stream to be transmitted to all the terminals 2, based on the control event. More specifically, the control is performed by controlling the open/close states of a plurality of transfer ports which have been assigned to a plurality of layered streams that together constitute a media stream, respectively.

As a result, in the present embodiment, the video-layer-count "m" is controlled based on the quality event of the audio media layer stream.

As described above, the media stream transmission device 1 is equipped with those functional constituents, and these functional constituents, excluding the network connection interface in the packet transceiver/receiver 101, are achieved by executing a media delivery program (not shown) with the computer (not shown) built in the media stream transmission device 1.

As illustrated in FIG. 2, each terminal 2 is configured to include a media output interface 20, a packet transceiver/receiver 21 (a transport protocol processing section, an IP processing section, and a network connection interface), an RTP/RTCP processing section 23, a multicast processing section 22, a decoder 24 for layered streams, a media stream playback device 25, a quality-event detector 26, and a service control processing section 27.

These functional constituents, excluding the media output interface 20 and the network connection interface in the packet transceiver/receiver 21, are achieved by executing a predetermined program (not shown) with a computer (not shown) built in each terminal 2.

The packet transceiver/receiver 21 and the multicast processing section 22 are common in structure to the packet transceiver/receiver 101 and the multicast processing section 102 in the above-described media stream transmission device 1, respectively.

The RTP/RTCP processing section 23 receives a media stream from the media stream transmission device 1 in RTP packets, and outputs the received media stream to the decoder 24. The RTP/RTCP processing section 23 ascertains synchronization between RTP packets and PTCP packets.

The decoder 24 decodes layered-coded media data, and generates an integrated media stream. The generated media stream is sent to the media stream playback device 25.

The media stream playback device 25, in response to a direction from the service control processing section 27, outputs the media stream to the media output interface 20. The media output interface 20 is, for example, in the form of a display and a speaker. Via these things, the media stream playback device 25 can playback the media stream while receiving.

The quality-event detector 26 detects or measures the quality event of the media stream that is being received from the media stream transmission device 1. More specifically, the quality-event detector 26 measures, for example, the packet loss rates and the delay jitter values, based on the information contained in packets sent from the RTP/RTCP processing section 23 which have been received through the decoder 24.

The quality-event detector 26 measures the quality event of an audio media stream. The measured quality event is outputted to the RTP/RTCP processing section 23.

The RTP/RTCP processing section 23 generates the quality event in RTCP packets. The RTCP packets are transmitted to the media stream transmission device 1.

The service control processing section 27 receives the quality event from the quality-event detector 26. The service control processing section 27, then, controls the media stream playback device 25, based on the received quality event.

More specifically, sets of control, such as packet loss compensation or playback speed control, are implemented. Further, additional sets of control, such as adjustment of sound volume to be played back or adjustment of the number of display screens in the media output interface 20, are implemented.

Second Exemplary Embodiment

Figure 4:
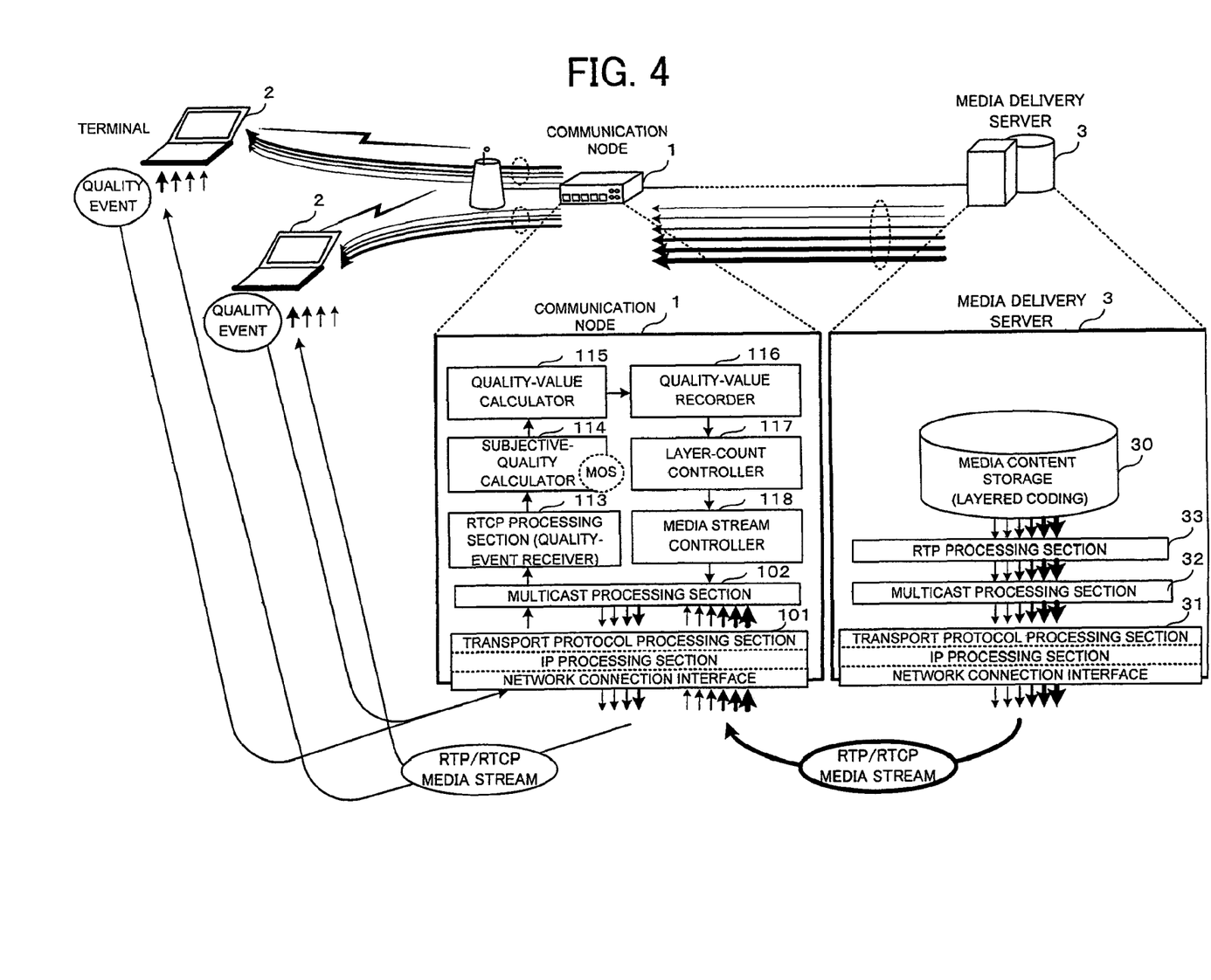
FIG. 4 is a functional block diagram illustrating a communication node constructed according to a second illustrative embodiment of the present invention, together with a media delivery server and a representative terminal both used in connection with the communication node.

Referring next to FIG. 4, a communication node 1 according to a second exemplary embodiment of the present invention will be described.

The present embodiment, however, shares so many common elements with the first exemplary embodiment illustrated in FIG. 2 that the present embodiment will be described in greater detail only with respect to elements different from the first exemplary embodiment, while the common elements will be omitted in detailed description by reference using the identical reference numerals or names, without redundant explanation of these common elements.

The communication node 1 is according to an embodiment of the second aspect of the invention, and this communication node 1 and a media delivery server 3 cooperate to constitute a media stream transmission device according to an embodiment of the first aspect of the invention.

FIG. 4 is a functional block diagram illustrating the communication node 1 according to the present embodiment.

In this embodiment, unlike in the first embodiment illustrated in FIG. 2, a first device for functioning as a media delivery server, and a second device for functioning as a media stream control server are physically separated from each other, and the first device is achieved by the media delivery server 3, while the second device is achieved by the communication node 1.

As illustrated in FIG. 4, the media delivery server 3, to function as a media delivery server, is configured, like the media stream transmission device 1 depicted in FIG. 2, to include a media content storage 30 for storing layered media contents, a packet transceiver/receiver 31, a multicast processing section 32, and an RTP processing section 33.

In addition, the communication node 1, to function as a media stream control server, is configured, like the media stream transmission device 1 depicted in FIG. 2, to further include an RTCP processing section (quality-event receiver), a subjective-quality calculator 114, a quality-value calculator 115, a quality-value recorder 116, a layer-count controller 117, and a media stream controller 118.

As illustrated in FIG. 4, the communication node 1 receives an RTP-based media stream from the media delivery server 3, and then transmits the received media stream to a plurality of terminals 2 in a multicast mode.

The communication node 1 receives quality events of the audio media layer stream from every terminal 2, while receiving the media stream (including the audio media layer stream and video media layer streams) from the media delivery server 3. The communication node 1 controls the video-layer-count "m" of the media stream that has been received from the media delivery server 3, and then, transmits the layer-count-controlled media stream to all the terminals 2 which are subordinate to the communication node 1.

Figure 5:
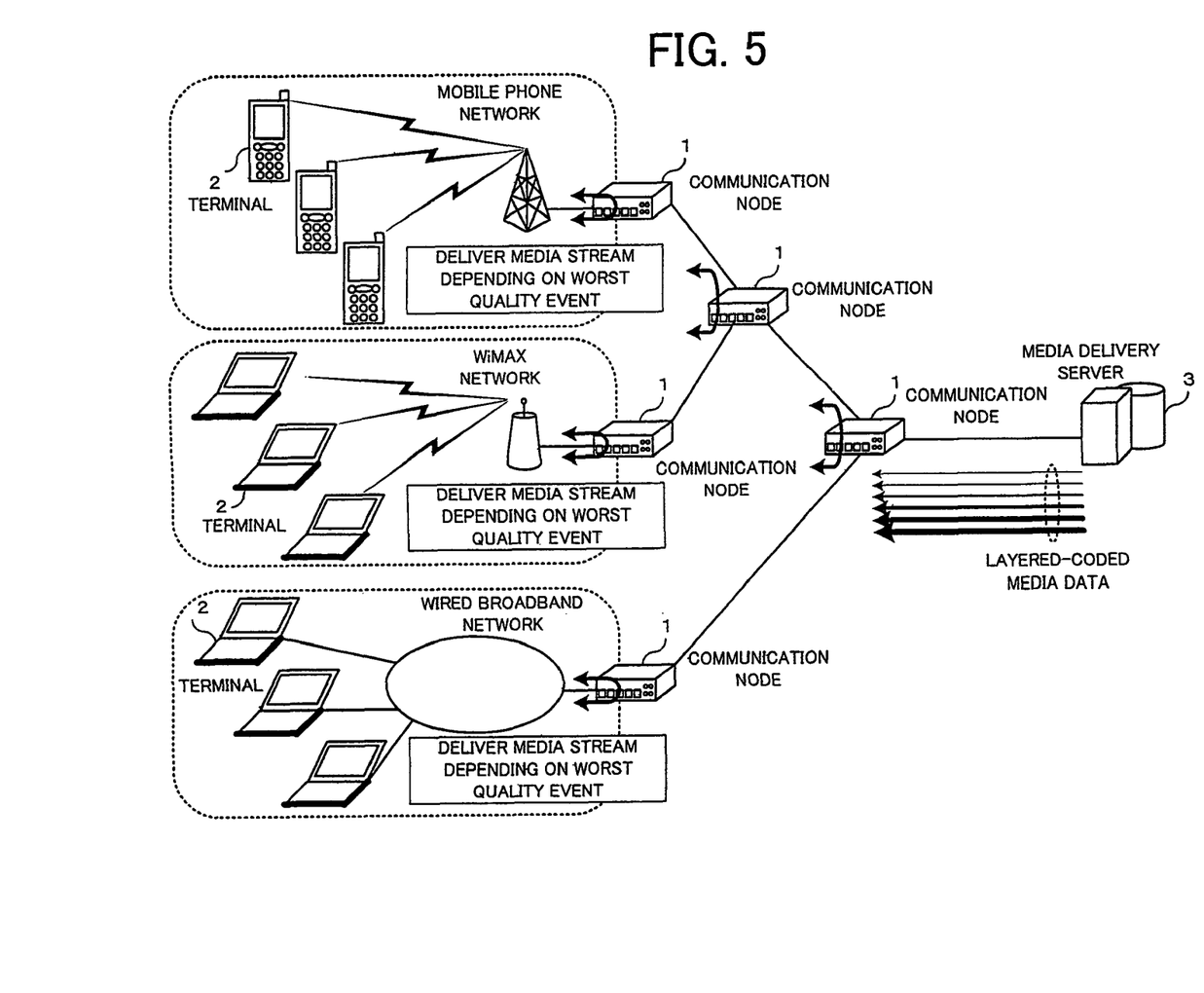
FIG. 5 is a view illustrating the configuration of a system for delivering media data, which is constructed by interconnecting a plurality of communication nodes, each of which is depicted in FIG. 4, so as to form a tree structure, and by using these communication nodes together with the media delivery server depicted in FIG. 4 and a plurality of terminals.

FIG. 5 is a schematic diagram illustrating a communication system, using the media delivery server 3 and a plurality of communication nodes 1, which allows media data to be delivered from the media delivery server 3, via at least one of the communication nodes 1, to the plurality of terminals 2.

In this embodiment, an IP network that can accommodate multicast transmission is constructed with a plurality of communication nodes 1 so as to form a tree structure. These communication nodes 1 are, in general, communications facilities managed by carriers. In this environment, a media stream is transmitted from upper communication nodes 1 to lower communication nodes 1 (in a layered multicast mode).

Each terminal 2 is connected to the lowermost communication node 1, via an access network. As such an access network, as illustrated in FIG. 5, there are, for example, a mobile telephone network, a WiMAX network, a wired broadband network, etc.

Each communication node 1 transmits a media stream to the plurality of terminals 2 which are subordinate to each communication node 1, in addition to other communication nodes 1 which are subordinate to each communication node 1, if any, after controlling its video-layer-count "m."

Each communication node 1, to control the video-layer-count "m," requires to be aware of the "equality event" in each terminal 2 which is subordinate to each communication node 1. In this embodiment, each communication node 1 can collect, in real-time, the "quality events" which are elements required for control of the video-layer-count "m," from the plurality of terminals 2 which are subordinate to each communication node 1, and can identify these quality events.

In this embodiment, the communication node 1 to which the plurality of terminals 1 are subordinate selects the worst one of a plurality of quality events that have been received from those terminals 2, and then controls, based on the selected quality event (i.e., the worst quality event), the video-layer-count "m" of a media stream that is to be transmitted commonly to those terminals 2.

It is added that the "quality event" indicative of the transmission quality of a media stream in each terminal 2 includes a packet loss rate and a delay jitter value. In this regard, the term "event" may be used to mean a "thing which happens," but is used here to solely mean "information."

Third Exemplary Embodiment

Figure 6:
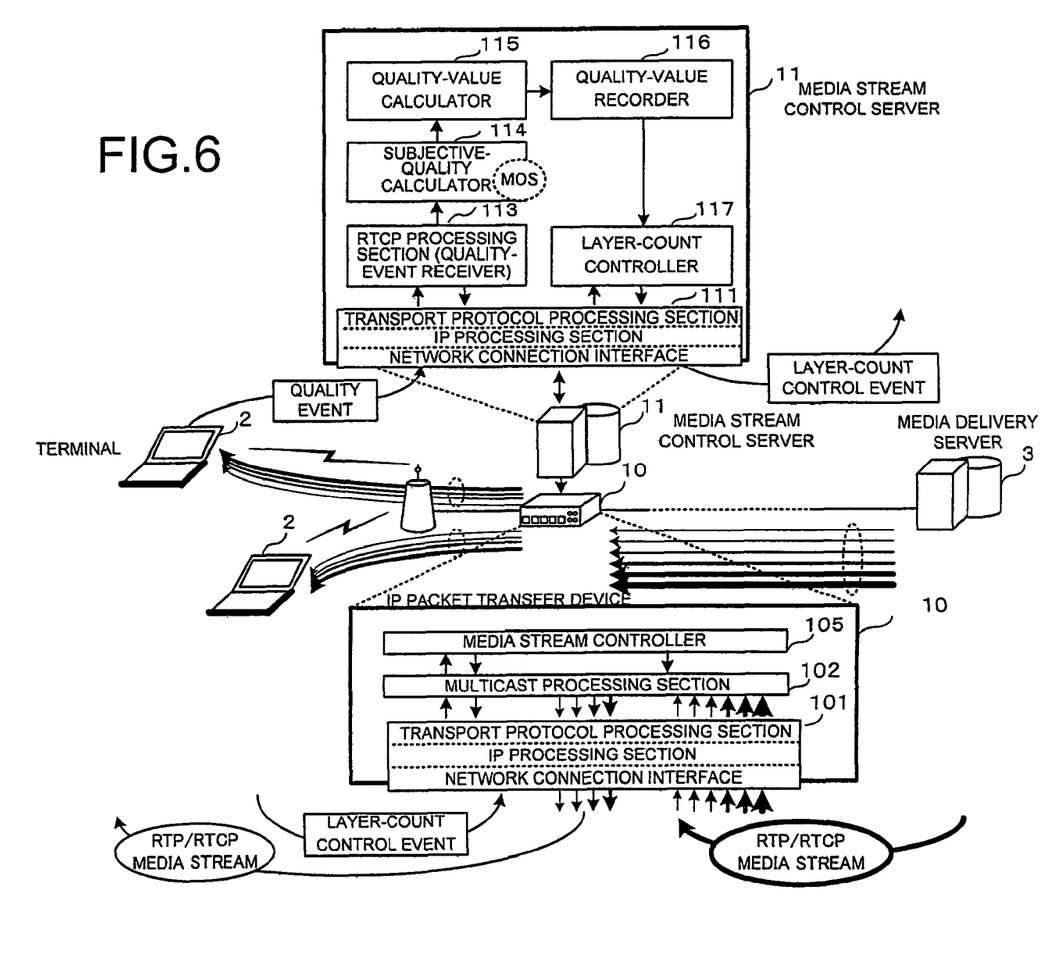
FIG. 6 is a functional block diagram illustrating a media stream control server and an IP packet transfer device together constructed according to a third illustrative embodiment of the present invention, together with a media delivery server and a plurality of terminals.

Referring next to FIG. 6, a combination of an IP packet transfer device 10 and a media stream control server 11 according to a third exemplary embodiment of the present invention will be described.

The present embodiment, however, shares so many common elements with the second exemplary embodiment illustrated in FIG. 4 that the present embodiment will be described in greater detail only with respect to elements different from the second exemplary embodiment, while the common elements will be omitted in detailed description by reference using the identical reference numerals or names, without redundant explanation of these common elements.

The combination of the IP packet transfer device 10 and the media stream control server 11 is according to an embodiment of the second aspect of the present invention, the IP packet transfer device 10 and the media stream control server 11 cooperate with the media delivery server 3, to constitute a media stream transmission device which is according to an embodiment of the first aspect of the present invention.

FIG. 6 is a functional block diagram illustrating the IP packet transfer device 10 and the media stream control server 11.

As illustrated in FIG. 6, in this embodiment, the communication node 1 according to the second exemplary embodiment is separated into the IP packet transfer device 10 and the media stream control server 11 which are interconnected via a multicast router 10. To the multicast router 10, the media delivery server 3 and a plurality of terminals 2 are connected.

The media delivery server 3 delivers a media stream, via the multicast router 10, to the plurality of terminals 2.

In the second embodiment illustrated in FIG. 4, the IP packet transfer functional-subsystem (the packet transceiver/receiver 101, the multicast processing section 102 and the media stream controller 118), and the media stream control functional-subsystem (the RTCP processing section 113, the subjective-quality calculator 114, the quality-value calculator 115, the quality-value recorder 116 and the layer-count controller 117) are mounted together in a single unit of the communication node 1.

In contrast, as illustrated in FIG. 6, in this embodiment, the communication node 1 is separated into the IP packet transfer device (IP packet transfer functional-subsystem) 10, and the media stream control server (media stream control functional-subsystem) 11.

More specifically, the IP packet transfer device 10, to provide the IP packet transfer function, is configured to include a packet transceiver/receiver 101, a multicast processing section 102 and a media stream controller 105. In addition, the media stream control server 11, to provide the media stream control function, is configured to include a packet transceiver/receiver 111, an RTCP processing section 113, a subjective-quality calculator 114, a quality-value calculator 115, a quality-value recorder 116 and a layer-count controller 117.

In this embodiment, the media stream control server 21 transmits to the IP packet transfer device 20 which has received a media stream from the media delivery server 3, the control event for the received media stream. Because of this, the IP packet transfer device 20 performs the layer-count control for the received media stream. The IP packet transfer device 20, then, transmits to the plurality of terminals 2 the media stream which has been controlled with respect to the video-layer-count "m."

Although there have been some exemplary embodiments of the present invention have been described above, the present invention may be practiced in alternative arrangements.

For example, in an arrangement, an upper communication node which transmits a media stream to lower communication nodes and which can control a media stream to be transmitted to the lower communication nodes, can control the video-layer-count "m" of the media stream by practicing the present invention.

More specifically, in an example, a media delivery server can transmit a 7-layer media stream to an upper communication node which is close to the media delivery server, and the upper communication node can transmit a 5-layer media stream to lower two communication nodes (i.e., first and second lower communication nodes) than the upper communication node with respect to the media delivery server.

In this example, the first lower communication node can transmit a 3-layer media stream to the lowermost communication node subordinate to the first lower communication node, while the second lower communication node can transmit a 5-layer media stream to the lowermost communication node subordinate to the second lower communication node.

In an alternative arrangement, a quality event which is received from terminals can be transmitted, via the lowermost communication node, to upper communication nodes, and the upper communication nodes can control the video-layer-count "m." The reason is that the area which IP packets can reach can be controlled depending on the setting of a packet filter of the IP packet transfer functional-subsystem (IP packet transfer device) of those upper communication nodes.

In this arrangement, the upper communication nodes control the video-layer-count "m" of a media stream that the upper communication nodes are going to transmit, based on the worst one of a plurality of quality events which have been received.

The embodiments of the present invention described above allow automatic estimation of quality actually perceived by a user who views or listens to a media stream at the user's terminal, based on the transmission quality (packet loss rates and delay jitter values) of the media stream that the terminal has actually received, and allow control of the video-layer-count "m," based on the estimated perceived quality.

Further, these embodiments allow services to be provided with quality that allows for the variations in transmission quality in a network, as a result of the control of the video-layer-count "m" of a media stream, based on a user-perceived quality.

Still further, these embodiments can keep a plurality of terminals equal to each other with respect to the reception (resource) of a media stream, and can improve the response of the layer-count control to the time-varying traffic congestion in the whole network, both of which are difficult to be achieved when the layer-count control is individually performed by each of terminals on the reception side.

Yet further, these embodiments can improve system scalability (how well a network can grow) without reliance on a media stream delivery server, by suitably locating a media stream control functional-subsystem (communication node) adaptive to a network topology for providing a media stream delivery service.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of controlling the number of an active one or more of original layers within a layered media stream received from a media delivery server,
   wherein the media stream is structured to have a maximum number "M" of layers that include "m (0<m<M)" video layers and an audio layer,
   the method comprising:
   receiving the media stream received from the media delivery server;
   transferring the received media stream to a destination;
   from the destination, receiving quality information indicative of audio quality of the audio layer received at the destination;
   based on the received quality information, estimating a value of subjective quality of the received audio layer at the destination; and
   based on the estimated value of subjective quality of the received audio layer, in combination with a ratio m/M of one of more number of video layers "m" that are being transmitted to the destination to the maximum number "M" of layers, controlling one or more number of active video layers that are to be subsequently transmitted within the media stream to the destination, such that the number of active video layers increases as a product of the estimated value and the ratio m/M increases.

2. The method according to claim 1, wherein the subjective quality is defined by a MOS (Mean Opinion Score) calculated based on a packet loss rate and packet delay information including at least one of a packet delay and a delay jitter value in packet transmission of the audio layer.

3. The method according to claim 2, wherein the MOS is calculated by an n-th degree equation described by coefficients and variables indicative of the packet loss rate and the packet delay information, and
   the coefficients are predetermined in accordance with a coding scheme that is to be applied to the media stream, such that a difference is minimized between a reference MOS (Mean Opinion Score) of the received audio layer, and an estimated MOS (Mean Opinion Score) of the received audio layer,
   wherein the reference MOS is calculated based on at least one of subjective quality and objective quality of the received audio layer, and
   the estimated MOS is calculated using a non-linear regressive model defined by the equation.

4. A non-transitory computer-readable storage medium which has stored therein a program, when executed by a computer, to implement the method according to claim 1.

5. The method according to claim 1, wherein the media delivery server is connected with a plurality of user terminals via a plurality of communication nodes, each communication node being able to serve as the destination, and
   each of the plurality of communication nodes transmits the media stream from the media delivery server to a sub-plurality ones of the plurality of user terminals in a multicast mode, the sub-plurality user terminals being subordinate to each communication node,
   the method further comprising,
   based on at least one of a plurality of quality events that each communication node receives from the sub-plurality of user terminals, reconfiguring the media stream received from the media delivery server, such that the number of active video layers of the media stream decreases as the at least one quality event becomes worse, wherein each communication node transmits the reconfigured media-stream to the sub-plurality of user terminals with a common number of active video layers.

6. A method of controlling the number of an active one or more of original layers within a layered media stream received from a media delivery server, wherein the media stream is structured to have a maximum number "M" of layers that include "m ($0<m<M$)" video layers, the method comprising:

receiving the media stream received from the media delivery server;

transferring the received media stream to a destination; and based on a ratio m/M of one of more number of video layers "m" that are being transmitted to the destination to the maximum number "M" of layers, controlling one or more number of active video layers that are to be subsequently transmitted within the media stream to the destination, such that the number of active video layers increases as the ratio m/M increases.

7. A non-transitory computer-readable storage medium which has stored therein a program, when executed by a computer, to implement the method according to claim 6.

8. The method according to claim 6, wherein the media delivery server is connected with a plurality of user terminals via a plurality of communication nodes, each communication node being able to serve as the destination, and each of the plurality of communication nodes transmits the media stream from the media delivery server to a sub-plurality ones of the plurality of user terminals in a multicast mode, the sub-plurality user terminals being subordinate to each communication node, the method further comprising, based on at least one of a plurality of quality events that each communication node receives from the sub-plurality of user terminals, reconstructing the media stream received from the media delivery server, such that the number of active video layers of the media stream decreases as the at least one quality event becomes worse, wherein each communication node transmits the reconstructed media-stream to the sub-plurality of user terminals with a common number of active video layers.

* * * * *